United States Patent [19]
Foehring et al.

[11] 3,805,736
[45] Apr. 23, 1974

[54] APPARATUS FOR DIFFUSION LIMITED MASS TRANSPORT

[75] Inventors: Robert A. Foehring, Williston; Richard R. Garnache, South Burlington; Donald M. Kenney, Shelburne, all of Vt.

[73] Assignee: International Business Machines Corporation, Armonk, N.Y.

[22] Filed: June 29, 1973

[21] Appl. No.: 375,308

Related U.S. Application Data

[63] Continuation of Ser. No. 212,800, Dec. 27, 1971, abandoned, which is a division of Ser. No. 345, Jan. 2, 1970, Pat. No. 3,672,948

[52] U.S. Cl. ................................................. 118/49
[51] Int. Cl. ........................................... C23c 13/10
[58] Field of Search ........................... 118/48–49.5; 117/107.1, 106, 107.2 R, 107.2 A, 107.2 C

[56] References Cited
UNITED STATES PATENTS

| | | | |
|---|---|---|---|
| 2,363,781 | 11/1944 | Ferguson | 117/107 |
| 3,047,438 | 7/1962 | Marinave | 118/49.5 X |
| 3,394,390 | 7/1968 | Cheney | 148/175 X |
| 3,473,510 | 10/1969 | Sheng et al. | 118/49.5 |
| 3,516,811 | 6/1970 | Gatchet et al. | 117/106 R X |
| 3,627,590 | 12/1971 | Mammel | 148/175 X |
| 3,635,683 | 1/1972 | Harrison et al. | 117/107.1 X |
| 3,679,463 | 7/1972 | Fleischner | 117/106 R |
| 3,688,737 | 9/1972 | Augustsson et al. | 118/48 |

FOREIGN PATENTS OR APPLICATIONS

| | | | |
|---|---|---|---|
| 722,866 | 2/1955 | Great Britain | 118/49 |

*Primary Examiner*—Morris Kaplan
*Attorney, Agent, or Firm*—Howard J. Walter, Jr.

[57] ABSTRACT

Apparatus for continuously carrying out mass transfer reactions in a reaction chamber utilizing laminar flow to provide diffusion limited transport and to provide isolation between process steps. There is provided a gaseous phase material inlet filter tube to introduce gaseous phase material in laminar flow within a reaction zone and an exhaust pressure baffle to maintain laminar flow throughout the reaction zone. Substrates may be continuously passed through a reaction zone to provide an inline system.

8 Claims, 8 Drawing Figures

APPARATUS FOR DIFFUSION LIMITED MASS TRANSPORT

This is a continuation of application Ser. No. 212,800 filed Dec. 27, 1971, now abandoned, which is a division of Ser. No. 345, Jan. 2, 1970, Pat. No. 3,672,948.

CROSS REFERENCE TO RELATED APPLICATION

The following copending application is assigned to the assignee of the instant application and relates to improvements in vapor deposition barrel reactors. It has been filed on the same day as the instant application. The application is entitled "Vapor Deposition Apparatus;" Inventor, R. R. Garnache; Ser. No. 344, now U.S. Pat. No. 3,603,284.

This invention relates to apparatus for mass transport processes, such as vapor deposition and etching, and in particular relates to a apparatus for providing and maintaining constant diffusion limited mass transport in a continuous system.

In the manufacturing of electronic components it has become increasingly important that manufacturers be capable of producing integrated circuitry on a mass production basis. The introduction of integrated circuits to the industry has created a demand for new methods and apparatus capable not only of high production volume but also of high quality components.

Numerous process steps are normally involved in the preparation of an integrated circuit, since the completed circuit may contain a number of different functional components and each component may require a different manufacturing process. It has become increasingly more important for a manufacturer to be capable of performing these processes with controlled reproducibility at relatively low cost.

The more familiar processes normally utilized in the production of integrated circuits and other solid state devices include: oxidation, diffusion, epitaxial deposition, etching. These different mass transport processes might generally be designated as vapor deposition, or vapor etching, as all utilize the contact by a gaseous phase material with a solid substrate upon which a desired material is either deposited or removed.

PRIOR ART

In the early development of vapor transport methods and apparatus the well known closed and open tube methods had been used almost exclusively in both experimental as well as production operations.

In the closed tube method, substrates and the desired reactant materials are first sealed in a quartz tube. The tube is then heated in one or more different areas in order to produce the desired temperature and mass transport drive conditions for evaporation and subsequent deposition by the vaporized reactants. The method is slow and cumbersome and gradually has given way to the more commonly used open tube diffusion method. The advantage of the open tube is that reactant gases can be constantly fed into the tube in order to maintain a sufficiently high concentration gradient to produce desired deposition rates. Since the reactant gases in the open tube method travel longitudinally down the tube, the concentration gradient of the reactants steadily decreases throughout the length of the tube thus producing a variety of deposition rates on substrates depending upon their location in the tube.

Attempts to improve deposition processes have recently been directed toward maintaining a tight control over reaction temperatures as well as reactant concentrations. In order to avoid the effect of depleated reactant concentration within a reaction tube, or vessel, many methods and apparatus have been developed which provide as much turbulence as possible within the reaction chamber. The reasoning behind this approach is based primarily upon the fact that if reactant gases are constantly agitated at a high throughput depositions would be improved. This approach while achieving maximum deposition rates through maximum substrate contact with reactant vapors has failed to solve the problem of deposition irregularities. The products of these methods proved to be highly irregular requiring the rejection of a high number of out of specification devices.

Still more recently, attempts have been made to devise continuous, or inline, systems in which a single, or multiple, step process could be carried out. The previously proposed continuous systems require a number of complicated process step isolation devices to prevent contamination from one process step from reaching another process step. These inter-process isolation devices include such contrivances as: gas curtains usually directed perpendicular to the direction of movement of substrates to carry away unwanted materials, positive or negative pressure devices located between process steps, gas jets aimed toward or away from different process sections of the system, elaborate vapor locks and various other devices. All of these physical isolation devices add considerably to the cost, operation and maintainence of the systems of the prior art.

In summary, no suitable automatic equipment to replace the batch systems has been devised.

SUMMARY OF THE INVENTION

It is therefore an object of this invention to provide a new and improved mass transport apparatus capable of providing improved products.

It is another object of this invention to further improve product uniformity in a continuous mass transport system by the reduction of turbulence in gas flow through a system.

It is still another object of this invention to provide a continuous mass transport apparatus which requires no interprocess isolation devices.

These and other objects are accomplished with the broad aspects of the present invention by providing a novel method and apparatus for diffusion limited mass transport. The invention provides substantially steady state diffusion limited mass transport through the use of laminar flow of gaseous phase reactants through reaction zones. The laminar flow is provided by a number of T-shaped fritted quartz, or sintered stainless steel, filter tubes located at one side of a process tube. Movably mounted substrate carriers are passed perpendicular to the direction of gas flow. Additionally, because of the use of laminar flow, there is no longitudinal flow of gas in the tube and virtually no mixing between zones, heating, cooling or other process steps may be carried out in a unitary chamber without disturbing adjacent reactions or process steps. Multiple process steps may all be carried out without the use of interprocess isolation devices.

BRIEF DESCRIPTION OF THE DRAWINGS

The foregoing and other objects, features and advantages of the invention will be apparent from the following more particular description of a preferred embodiment of the invention, as illustrated in the accompanying drawings.

GENERAL DESCRIPTION

Although the method and apparatus of the instant invention may generally be applicable to many vapor transport processes, only a typical reaction will be specifically referred to. The reaction that is illustratively employed to demonstrate the preferred embodiment of the instant invention is the reduction of silicon tetrachloride by hydrogen, described by the equation:

$$SiCl_4 + 2H_2 \underset{\longleftarrow}{\overset{Heat}{\longrightarrow}} Si + 4HCl.$$

In actuality the reaction is more complex and depends upon reactant concentrations, temperature, pressure and reactor geometry, all of which may result in various side reactions. Since the reaction is reversible, etching and other mass transport processing may also occur. It will be apparent to those skilled in the art that other vapor transport reactions may be similarly utilized. For example, the following reactions are possible: disproportionation, decomposition, condensation and gas cracking. Additionally, since a number of such reactions are reversible, the removal of films, or material, from substrate surfaces, as well as the deposition of material, is possible. Thus, reference to vapor deposition processes in describing the instant invention may also be considered to include any heat induced chemical vapor deposition or etching process.

DETAILED DESCRIPTION

Figure 1:
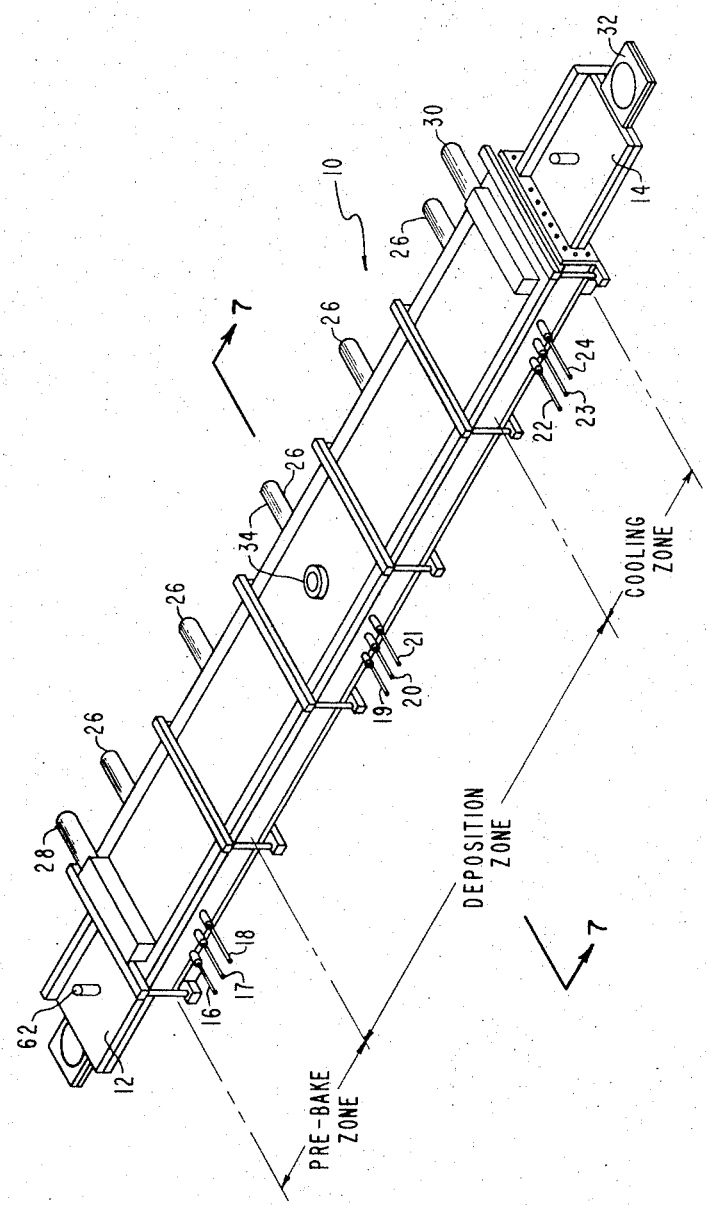
FIG. 1 is an overall isometric view of a preferred embodiment of the instant invention.

Referring now to FIG. 1, there is shown an isometric view of a preferred embodiment of the present invention, generally designated 10. The process tube 10 is generally rectangular in cross section and has provided at one end an entrance gate 12 and at the other end an exit gate 14, both to be described more fully later. The central portion of the process tube 10 between the entrance and exit gates comprises a continuously open chamber divided into three process zones, i.e., pre-bake, deposition, and cooling. A number of gas inlet tubes 16–24 are provided to supply gases to the various zones. Exhaust gases leave the process tube through exhaust tubes 26 after passing across process tube 10. Cooling water is circulated through a water jacket fed by water inlet tubes 28 and water exit tubes 30 mounted on the top and bottom of process tube 10. Substrates are mounted on carriers 32 which may be continuous passed through process tube 10. There is also provided a viewing port 34 for in-process inspection of substrates as they pass through the deposition zone.

Before describing the process tube of FIG. 1 in greater detail, a brief description of the broad aspects of the operation of the process tube will be provided.

Figure 2:
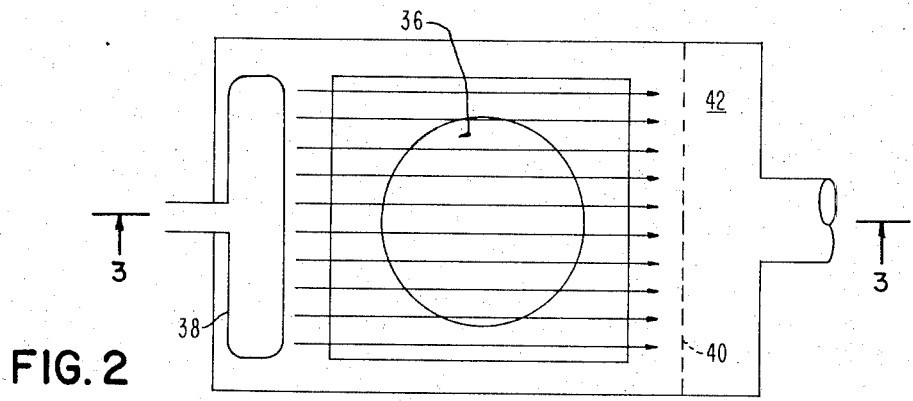
FIG. 2 is a schematic plan view of a portion of the deposition zone of the apparatus of FIG. 1.

FIG. 2 schematically shows a plan view of an ideal deposition, or vapor transport, zone. In order to pass the gaseous phase reactant material through the transport zone and over the flat surface of substrates 36 there is provided a fritted quartz, or sintered stainless steel vapor diffuser, or filter tube 38, preferably having a pore size of 10 microns. The filter tube behaves exactly as the classical porous plug and similarly there is no enthalpy change as the reactant gases pass through the walls of the filter tube. The reactant gases are uniformly passed into the deposition zone along the entire length of filter tube 38. Since the filter tube 38 substantially fills the entire end of the deposition zone, as will be more clearly shown in reference to FIG. 8, the gases leaving the filter tube create substantially laminar flow throughout the deposition zone. Provided on the opposite side of process tube 10, after the reactant gases have passed over the surface of substrate 36, there is provided an exhaust baffle 40. Exhaust baffle 40 allows for the uniform removal of gaseous reactant materials and deposition process byproducts. The exhaust baffle 40 may be, for example, a perforated steel plate or a sintered stainless steel filter plate having a porosity sufficient to provide a back pressure a number of orders of magnitude greater than the longitudinal pressure drop in the exhaust plenum 42. Preferably exhaust baffle 40 is a perforated steel plate having 1 mil holes at 1,000/in². The filter tube 38 and the exhaust baffle 40 act together to provide laminar flow across the surface of substrate 36, as shown by the parallel lines in FIG. 2.

Figure 3:
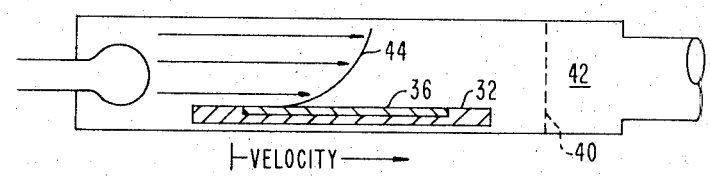
FIG. 3 is a vertical schematic section of the deposition zone of FIG. 2 showing the velocity profile of reactant gases under ideal conditions.

FIG. 3 shows the ideal condition of laminar flow, in a vertical plane. The velocity profile 44 is shown to illustrate how the diffusion limited transport takes place. The velocity of reactant gases is zero at the substrate surfaces and progressively greater, up to a maximum velocity, through the deposition zone. Reactant material concentration is depleted from the gaseous material in close proximity to the substrate surface. This causes a net concentration unbalance and results in diffusion in the direction of the depleted area — i.e., toward the substrate surface. The substrates are heated, by means not shown, to the desired reaction temperature and as reactants diffuse toward this hot surface they pass through a temperature gradient which, at the substrate surface, is sufficient to cause the desired reaction to occur. Because the reactant gases are passed over the substrate surfaces in laminar flow it is possible to maintain a substantially uniform, and controllable, deposition rate. Thus, the deposition, or other vapor phase reaction, is limited by the diffusion rate into the depleted boundary zone. Because turbulent flow is not used, no unpredictable irregularities in the flow pattern can cause irregular deposition rates at different parts of a substrate surface.

Figure 4:
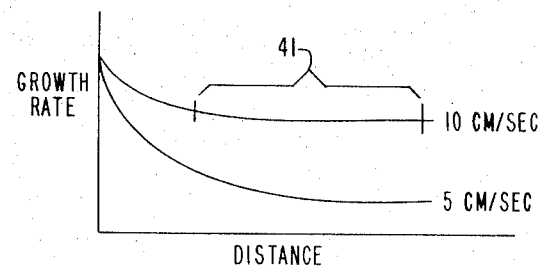
FIG. 4 is a plot of deposition growth rate versus distance for diffusion limited mass transport.

It should be noted that because some of the gaseous reactants are removed from the vapor stream as it passes over the substrate and carrier, the net concentration of the reactants will be decreased as the distance from initial deposition increases thus decreasing the diffusion or deposition rate at points further from the edge of the substrate carrier as shown in FIG. 4.

FIG. 4 is a plot of the deposition growth rate versus the distance from the initiation of deposition across the flat surface of the substrate and substrate carrier. The maximum growth rate is reaction limited and occurs only while the concentration of the reactants remains constant. This condition only occurs at the first point of deposition as the concentration after deposition begins will decrease, thus preventing the reaction limited rate from controlling. After deposition begins, in a laminar flow system, the deposition growth rate is diffusion limited and dependent upon the velocity of the reactant gases moving over the substrate surface. At a selected velocity, for example 10 cm./sec., the deposition rate will be almost flat a short distance away from the beginning of deposition as indicated at 41. If substrates are not mounted at the edge of the substrate carrier, but are set back as shown in FIGS. 2 and 3, the entire substrate will fall into the flat portion of the diffusion limited transport curve, 41. Unlike a turbulent system, which operates on the nearly vertical portion of the curve, the laminar flow system is more closely controllable and thereby more easily reproducable. Since the deposition rate curve still decreases slightly with distance it is preferable to pass reactant materials over only a single substrate in order to minimize the effects of the decreased rate.

It will also be seen that if the concentration in the gaseous phase materials were less than that in the area close to the substrate surface a reversal of the diffusion limited transport would occur and etching, or removal of the material, of a substrate would be possible. For example, if HCl were utilized as a reactant gas and the substrate surface was silicon, a reversal of the above-referred to reaction, the production of $SiCl_4$ and $H_2$, would occur.

Figure 5:
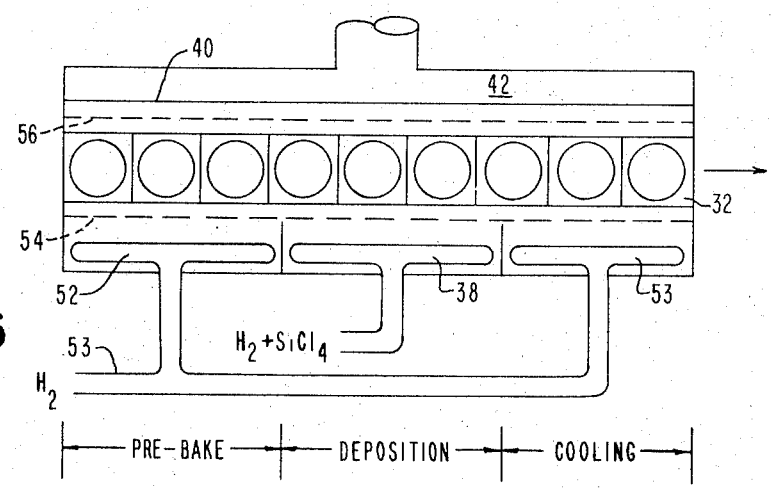
FIG. 5 is a schematic overall view of the process tube of FIG. 1.

Referring now to FIG. 5, there is shown a schematic diagram of a preferred form of the invention. The drawing shows a deposition zone located generally in the center of the process tube. This zone operates exactly as described above in reference to FIGS. 2 and 3. However, in order to provide a controlled environment for substrate surfaces entering the deposition zone there is provided a pre-bake zone. The purpose of the pre-bake zone is to raise the temperature of the substrates carried on substrate carrier 32 to the proper reaction temperature before they enter the deposition zone. This is achieved by a resistance heating element, not shown, located under the substrate carriers 32 and extending for substantially the entire length of the pre-bake and deposition zones. While the substrates are being heated, high purity hydrogen gas is admitted to the pre-bake zone through a pre-bake filter tube 52 in order to ensure that no impurities enter the deposition zone and to avoid side reactions. The structure of the pre-bake zone is the same as that of the previously described deposition zone. That is, the hydrogen travels across the wafer surfaces in laminar flow.

Located downstream from the deposition zone is a cooling zone. This zone like the pre-bake and deposition zones also contains gas in laminar flow as delivered by cooling filter tube 53. The purpose of the cooling zone is to remove any traces of $SiCl_4$ carried over from the deposition zone and to cool substrates prior to removal from the process tube 10.

One of the criteria for successful operation of process tube 10 is that longitudinal flow of gaseous material cannot be permitted, as this would create mixing between the separate gases in each zone. To prevent longitudinal flow, the pressure drop across each end of the process tube 10 must be the same. Since the pressure drop through the walls of the filter tubes is significantly greater than the axial pressure drop inside the tubes, the mass flow rate per unit length of filter tube is constant. And since the mass flow rate through the filter tubes is only a function of pressure, the temperature being constant, the mass flow rate from the tubes will be constant for a constant inlet pressure. Other than providing an elaborate metering system for providing separate gas flows, pressure equalization may be accomplished as shown in FIG. 5. Hydrogen gas, a carrier, supplied to both the pre-bake and cooling zones, is fed into the system through a single inlet manifold 53. Reactant gases $H_2$ and $SiCl_4$, are added in a separate line leading to the deposition zone.

Because laminar flow is maintained in each of the three zones, there is virtually no intermixing between zones, except for a slight amount of diffusion caused by the presence of a concentration gradient of $SiCl_4$ between the deposition and its adjoining zones. The use of laminar flow allows the entire three step deposition process to be carried out in a single chamber without need for barriers or other inter-process isolation devices.

Also shown in FIG. 5 are two optional heat shields 54 and 56 which may be utilized to reduce the loss of heat radiating from heated substrates 36 without substantially effecting the laminar flow of gases through the reaction zone. The heat shields may, for example, be sheets of perforated 0.060 inch thick molybdenum with approximately 10 percent open area. An economic evaluation should be made to determine to what extent laminar flow may be sacrificed in order to provide the benefit of reducing radiant heat lost by the wafers.

Having described the broaded aspects of the method and apparatus of the present invention, a more detailed description of the preferred embodiment follows.

Figure 6:
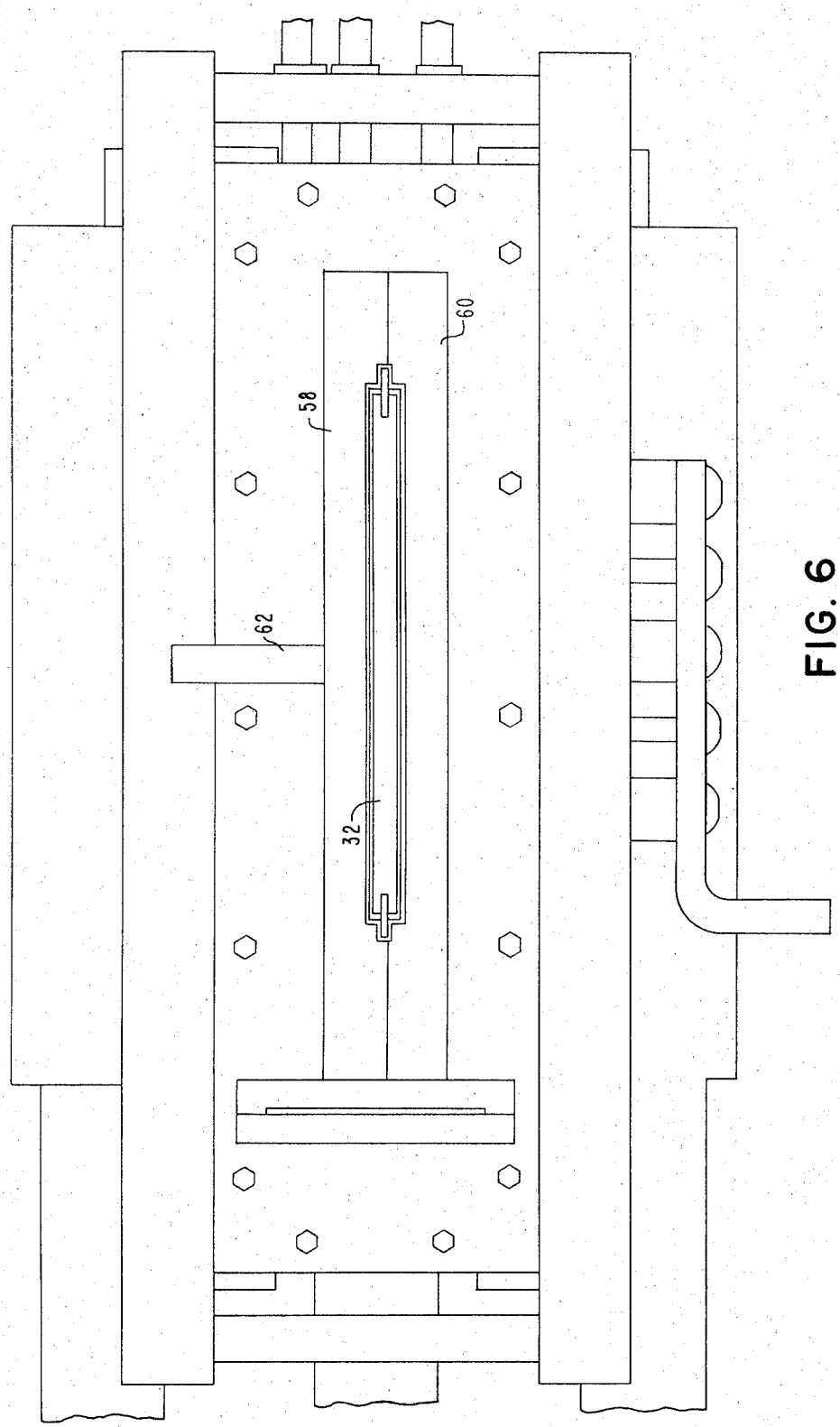
FIG. 6 is a detailed elevation of the left end, or entrance gate, of the process tube of FIG. 1.

Referring again to FIG. 1 it will be recalled that the preferred embodiment of process tube 10 consists of a long rectangular tube having an entrance gate 12 and an exit gate 14. The process tube may, for example, be about 10 feet long. The entrance and exit gates are similar in construction and provide means for passing substrates into and away from the process zones. FIG. 6 shows an elevation view of entrance gate 12. The gate may be constructed of a top and bottom slotted plate, 58 and 60, which are machined such that a substrate carrier 32 will pass through the slot with a minimum clearance. An inert gas, for example, argon, is continuously fed into the gate through tube 62 which communicates with the slot in plates 58 and 60. The longitudinal location of tube 62 on top plate 58 is determined depending upon the size of the opening between the slot and the substrate carrier, the difference in pressure between the atmosphere and the inside of the process tube and the extent to which argon leakage into the process tube can be tolerated.

It is preferable that a net flow rate of argon into the process tube be about 1 liter per minute and about 2 liters per minute into the atmosphere. Depending upon the length of the entrance, or exit, gate, sufficient positive pressure should be maintained to prevent any leakage from the system.

Substrate carriers 32 may be constructed of high purity commercially available graphite and have a longitudinal guide made of pyrolytic graphite or molybdenum which runs along the entire edge of the carrier. The carrier 32 is generally rectangular, preferably square, and must have relatively flat leading and trailing edges in order to provide a seal between carriers as they pass continuously through the process tube. Substrates are mounted on carriers 32 with their flat deposit receiving surfaces flush with the top of the carrier, in order to prevent turbulence inside the process tube. The carrier must be sufficiently larger than substrates in order to get the flat portion of the growth curve to fall on the substrate. Carriers may be fed into the process tube by any of the available feeding mechanisms of the prior art capable of presenting a continuous string of carriers to the process tube.

Figure 7:
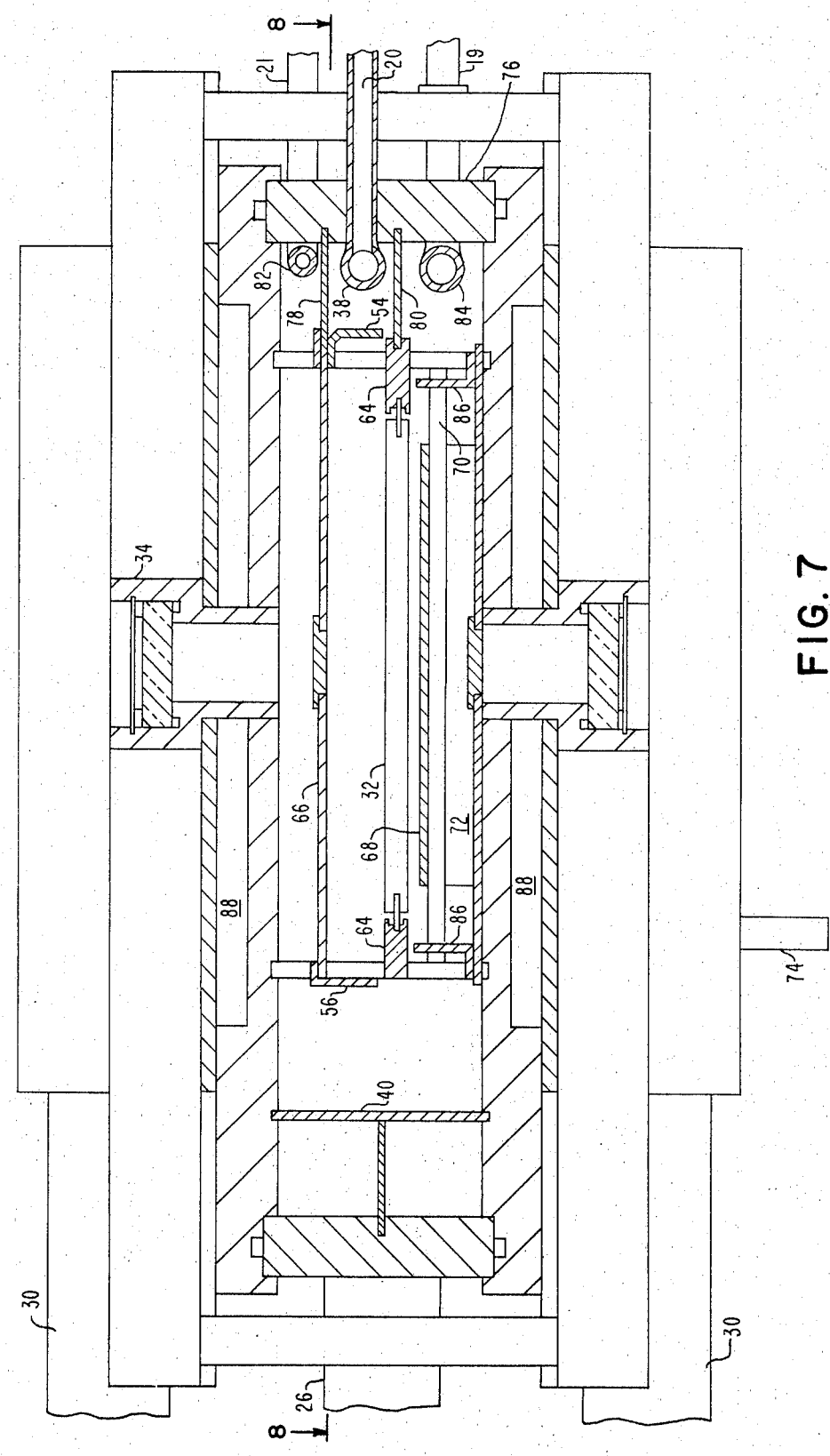
FIG. 7 is a detailed section of the process tube of FIG. 1 taken at 7—7.
Figure 8:
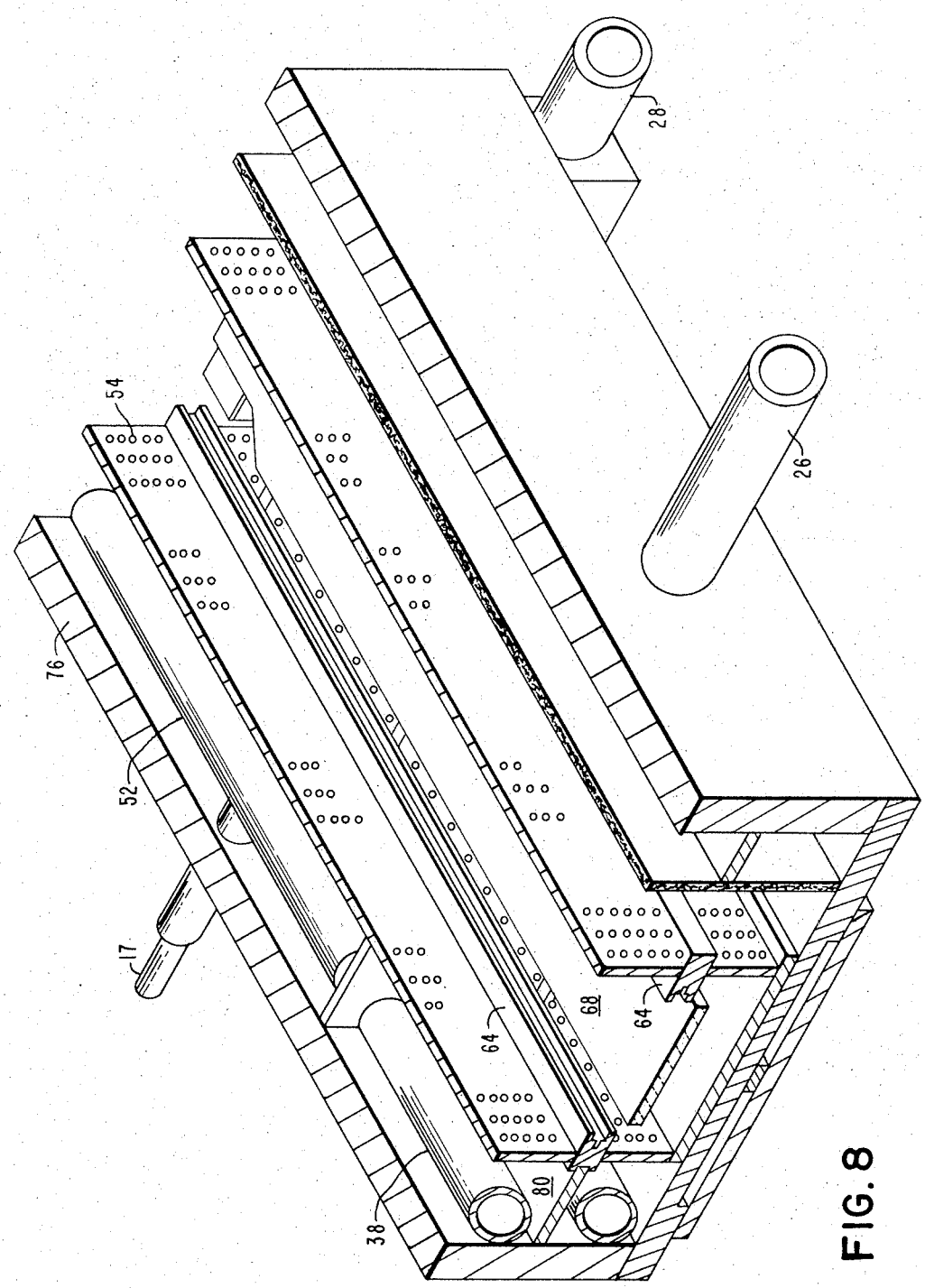
FIG. 8 is a partial isometric sectional view showing the inside of the pre-bake and part of the deposition zone taken at 8—8 of FIG. 7, as seen from the rear of the process tube of FIG. 1.

Referring now to FIGS. 7 and 8 which show the elements inside process tube 10, it will be seen that the process tube is divided into three separate levels. The deposition, or vapor transport, zone as previously described, being in the center.

The transport zone is defined by the following elements. The substrate carrier 32 and guide tracks 64 form the bottom, perforated heat shields 54 and 56 the sides, and top heat shield 66 the top. The transport zone is defined longitudinally by the length of filter tube 38.

Mounted directly below the pre-bake zone, and running the length of the pre-bake and deposition zones, is a resistance heater strip 68 which is supported at a number of points along its length by refractory rods 70. Heater strip 68 may be made of graphite and is mounted at both ends on a terminal block 72. Because the heater strip 68 expands when heated there is also provided at the entrance end (not shown) of process tube 10 a slide block containing compression springs to maintain the heater strip in an extended state. Connected to heater strip 68 at both ends is an electrical terminal 74 which extends through the bottom plate of the process tube and is best illustrated in FIG. 7. Heater strip 68 is also utilized to maintain substrate surfaces at the desired transport process temperature in the transport zone.

In order to provide means for passing gaseous phase material through the deposition zone there is provided, to the right of the heat shield 54, the deposition filter tube 38 which is connected to the middle gas manifold 17 through the right side plate 76. Additionally, there is provided a top and bottom gas chamber partition 78 and 80 to confine the gaseous material to the proper zone.

To prevent deposition on top heat shield 66 a continuous flow of gas is maintained in contact with the heat shield to maintain the temperature of heat shield 66 below the reaction temperature. The gas is provided by a top filter tube 82 mounted in side plate 76 and connected to top gas manifold 21. The gas may be hydrogen and it may be delivered from the same source as was discussed above in reference to FIG. 5.

In order to prevent leakage from the deposition zone and to assist in preserving heat in the process tube, a bottom filter tube 84 is provided. Filter tube 84 is mounted directly beneath deposition filter tube 38 on right side plate 76 and connected to bottom gas manifold 19. As the desired gas, for example argon, passes from tube 84 under guide tracks 64 it passes through heat shields 86. The gas applied to the bottom gas manifolds 16, 19, 22 may be delivered from a single supply.

After the gases pass through the above described elements they encounter exhaust baffle 40 which functions as described above with reference to FIG. 2. The gases then leave the process tube by way of exhaust tube 26.

In order to control the temperature of the process tube 10 and to assist in removing excess heat from the deposition zone, the top and bottom of the process tube is provided with water jackets 88.

FIG. 6 also shows the detail of the viewing port 34 which is optional and may be constructed with materials well known in the art.

In summary, the preferred embodiment of FIGS. 1, 5, 6, 7, and 8 is designed to provide and maintain the proper conditions for diffusion limited mass transport as more generally described with reference to FIGS. 2, 3, and 4. In operating the process tube of the present invention, it should be realized that an initial start up period will be necessary. The heater strip should be energized and the carrier gas, hydrogen, should be applied to all inlet manifolds to provide the proper heat exchange conditions. It is preferable that the process tube be filled with substrate carriers and scrap, or dummy, substrates in order that proper flow conditions may be obtained. Argon should be applied to both the entrance and exit gates to prevent gases inside the process tube from escaping into the atmosphere. After the process tube has stabilized the reactant material, $SiCl_4$, may be added to the hydrogen flow in the deposition zone in the desired proportion to carry out the deposition process. Substrates may then be continuously passed through the process tube for extended periods. Little or no deposition will be found on the internal elements of the system due to the fact that only substrates and substrate carriers will be at the proper deposition temperature.

While the invention has been particularly shown and described with reference to a preferred embodiment thereof, it will be understood by those skilled in the art that various changes in the form and details may be made therein without departing from the spirit and scope of the invention.

What is claimed is:

1. Apparatus for effecting vapor transport processes between gaseous phase material and substantially flat substrate surfaces comprising:

means defining at least one longitudinally extending chamber;

means to convey substrates through the longitudinal extent of said chamber;

means defining a vapor transport zone within said chamber, said last recited means comprising a first vapor diffuser means extending longitudinally across said vapor transport zone and adapted to dispense a first gaseous phase material in laminar flow which is substantially parallel to said substrate surfaces and in a direction perpendicular to the path through which the substrates are conveyed, and exhaust means disposed in opposed relationship to said first diffuser means; and means defining at least one additional zone within said chamber longitudinally adjacent and contiguous to said vapor transport zone, said last recited means comprising a second vapor diffuser means extending longitudinally across said additional zone and adapted to dispense a second gaseous phase material in laminar flow which is substantially parallel to said substrate surfaces and in the same direction as said first gaseous phase material, and exhaust means disposed in opposed relationship to said second vapor diffuser; said zones being structurally in fully open communication with one another and processwise substantially serially isolated from one another as a result of said laminar flow induced by said first and second vapor diffuser means.

2. The apparatus as defined by claim 1 wherein at least one of said vapor diffuser means comprises a cooling zone.

3. The apparatus as defined by claim 1 wherein said additional zone comprises a pre-bake zone.

4. The apparatus as defined by claim 1 wherein at least one of said vapor diffuser means comprises porous tubular members.

5. The apparatus as defined by claim 1 wherein said additional zone comprises a cooling zone.

6. The apparatus as defined by claim 1 wherein at least one of said vapor diffuser means comprises sintered stainless steel.

7. The apparatus of claim 1 wherein there is provided additional laminar flow producing means comprising pairs of perforated plate elements, including one plate element operatively associated with said diffusers and exhaust means.

8. Apparatus as defined in claim 1 wherein said vapor transport zone is partially defined by a radiation reflecting heat shield to prevent excess loss of heat from said transport zone.

* * * * *

PO-1050
(5/69)

UNITED STATES PATENT OFFICE
CERTIFICATE OF CORRECTION

Patent No. 3,805,736　　　　　　　　Dated April 23, 1974

Inventor(s) Robert A. Foehring et al

It is certified that error appears in the above-identified patent and that said Letters Patent are hereby corrected as shown below:

In Column 9, lines 22 and 23 and Column 10, line 1, delete Claim 2 and insert the following claim:

2. The apparatus of Claim 1 wherein at least one of said vapor diffuser means comprises fritted quartz.

Signed and sealed this 13th day of May 1975.

(SEAL)
Attest:

RUTH C. MASON
Attesting Officer

C. MARSHALL DANN
Commissioner of Patents
and Trademarks